Dec. 25, 1934.     K. YUASA     1,985,478
IMPACT TESTING MACHINE
Filed Aug. 21, 1931     3 Sheets—Sheet 1
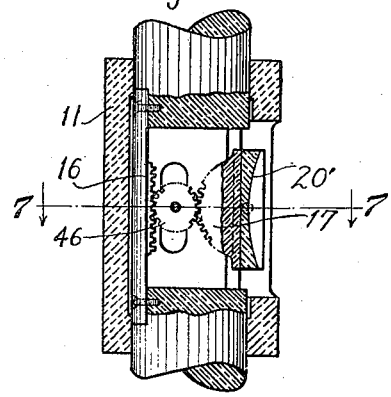
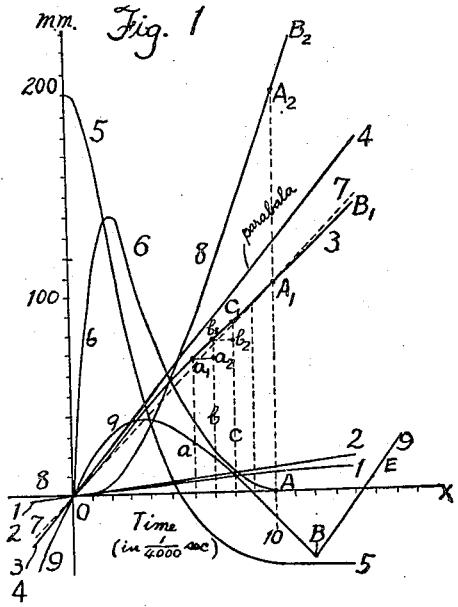
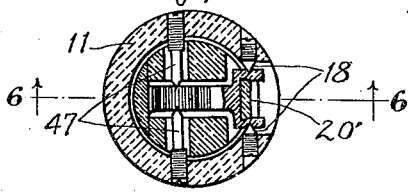
INVENTOR.
Kameichi Yuasa Dec. 25, 1934.  K. YUASA  1,985,478
IMPACT TESTING MACHINE
Filed Aug. 21, 1931   3 Sheets-Sheet 2
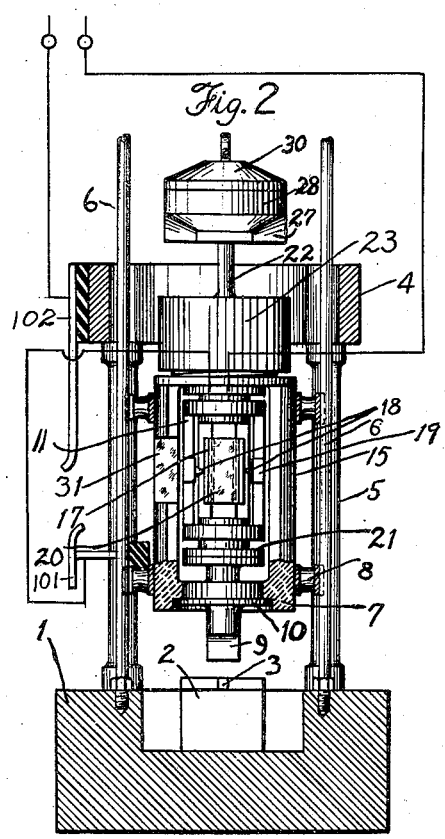
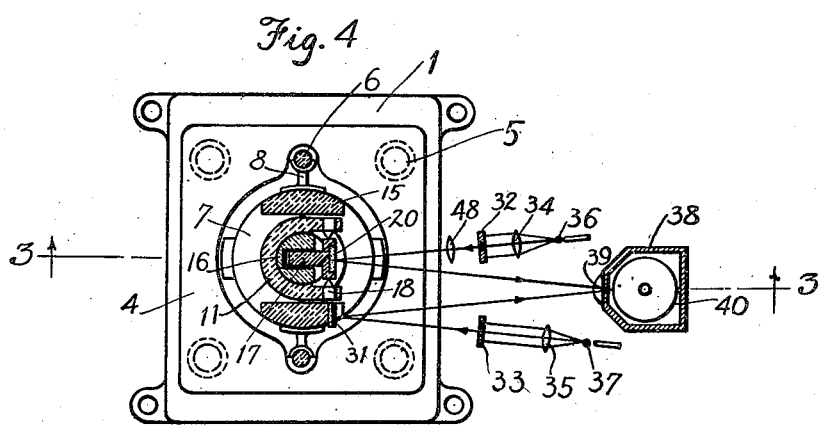
INVENTOR.
Kameichi Yuasa
BY
Featherstonhaugh & Tansley
ATTORNEYS.

Dec. 25, 1934. K. YUASA 1,985,478
IMPACT TESTING MACHINE
Filed Aug. 21, 1931 3 Sheets-Sheet 3
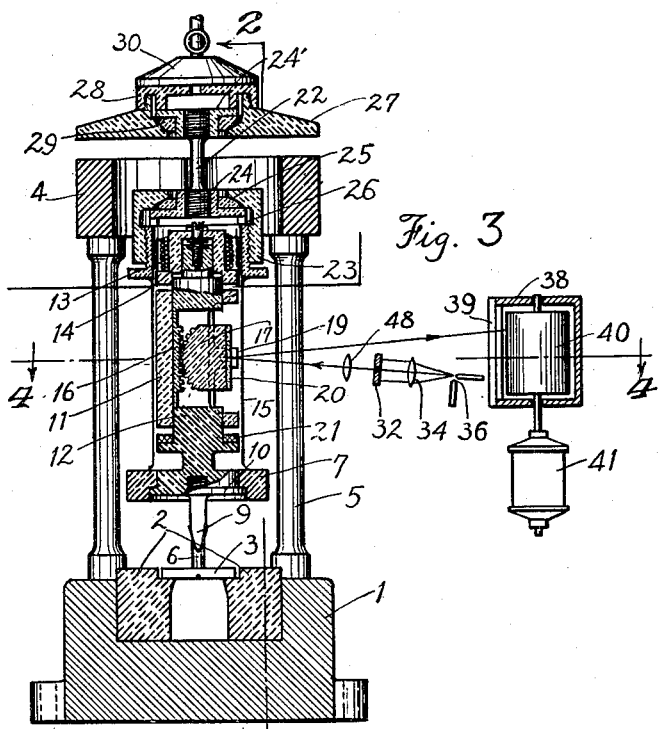
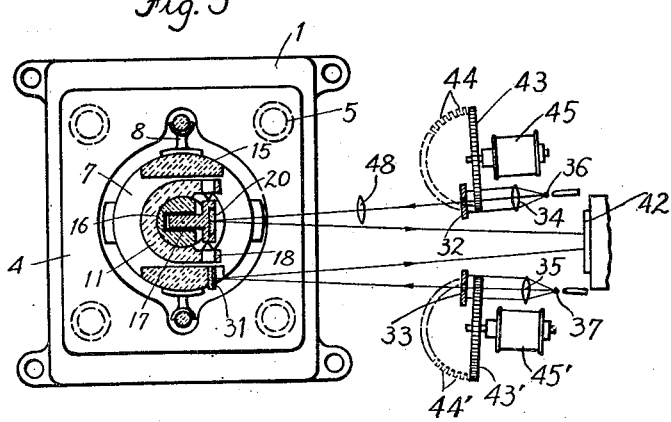
INVENTOR.
Kameichi Yuasa
BY
Featherstonhaugh & Tansley
ATTORNEYS.

Patented Dec. 25, 1934

1,985,478

UNITED STATES PATENT OFFICE 1,985,478

IMPACT TESTING MACHINE

Kameichi Yuasa, Tokyo-Fu, Japan

Application August 21, 1931, Serial No. 558,586
In Japan August 25, 1930

4 Claims. (Cl. 265—2)

My invention relates to an improvement in impact testing machines adapted to be used for tension, and bending tests and more particularly to such a type of testing machines which facilitates recording the change in motion, that is, acceleration or deceleration of the drop hammer in an enlarged scale by means of a compound hammer having an auxiliary weight and by taking advantage of relative displacement between the main and auxiliary weights constituting the compound hammer.

The object of this invention is to provide an improved impact testing machine which will give very accurate results by recording a relative displacement which is necessary for the measurement by means of a differential method so that the momentary high speed phenomena can be easily recorded as it is changed into a comparatively low speed and the material investigation up to about the elastic limit can be very favorably carried out with a great amplification of accuracy.

In heretofore known impact testing machines, the amount of energy absorbed by the test piece until it has been broken can be measured, yet the resisting force of the test piece against the impact could never be measured. Accordingly the result of a test obtained by such an impact testing machine gives no data for the design of a piece subjected to the impact so that the design of such pieces has been entirely left to the designer's assumptions.

Some contrivances for measuring such resistance against the impact upon a test piece have recently been proposed, yet the proposed machines are designed to give the combined result of essential and non-essential factors which is unnecessary for finding said resisting force as it precludes the separate determination of the effective factor; accordingly the latter can not be recorded on an enlarged scale. Moreover it is very difficult to accurately find out the resisting force of the test piece from a diagram obtained by the test results so that the reliable result could never be obtained.

This invention is to obviate the above mentioned defect by eliminating a greater part of unnecessary harmful effect during the motion of the hammer by means of a differential method and to record the small necessary portion on an enlarged scale.

The following description and drawings illustrate the application of the invention to a drop hammer type impact tension and bending testing machine, but it is to be understood that it is not to be confined to such type only, but this invention may be embodied in pendulum type impact testing machines as well as a revolving disk type impact torsion testing machine without departing from the spirit of this invention.

Fig. 1 of the accompanying drawings illustrate various curves obtained by the impact tension testing machine taken from the explanation of the principle involved in this invention; Fig. 2 is a section of the impact tension and bending testing machine embodying my invention taken on the line 2—2 (Fig. 3); Fig. 3 is its sectional side elevation taken on the line 3—3 (Fig. 4); Fig. 4 is its sectional plan view taken on the line 4—4 (Fig. 3); Fig. 5 is a sectional plan view of a modified arrangement of a similar testing machine taken on substantially the same line as Fig. 4; Figs. 6 and 7 are a partial sectional elevation and its cross-section respectively of a modified arrangement of the main and auxiliary drop weights, said sections being taken respectively on the lines 6—6 (Fig. 7) and 7—7 (Fig. 6), and Fig. 8 represents a diagram taken by the testing machine shown in Fig. 5.

Prior to entering into the description of the construction of this testing machine embodying my invention I will describe the principle of operation involved in an impact test. Referring to Figure 1 of the accompanying drawings, the curve 1 represents a displacement-time curve recorded by an ordinary single drop-hammer impact testing machine having no auxiliary hammer such as Sharpy's impact tension testing machine wherein the displacement of a drop hammer just before the hammer gives a blow to a test piece and after the test piece was broken, is taken on the ordinate and the time on the abscissa according to the usual practice in the art. The initial point O corresponds to the position at which the hammer gives a blow to the test piece. The portion of the curve from the point O to the point of inflection A represents the motion of the hammer after it has impinged on the test piece and the curve gradually deviates from the parabola of the freely falling body and the portion of the curve 1 before the point O and and also beyond the point A is a parabolic curve illustrating the free dropping motion of the hammer before it impinges on the test piece and after it has completed the breaking thereof.

The curve 2 in Figure 1 is a parabolic curve illustrating the displacement-time curve of the hammer which is freely dropped from the same height without impacting upon the test piece in the same testing machine and accordingly the difference between corresponding points on both curves 1 and 2 will represent the resistivity of the test piece at each point. The curves 3 and 4 in Fig. 1 are enlargements of the curves 1 and 2 respectively, the ordinate being enlarged 10 times. The curve 5 is the speed-time curve of the hammer which is plotted with values obtained by differentiating the curve 3 or 1 with regard to the time and the curve 6 represents a negative acceleration-time curve of the hammer which is obtained by further differentiating the curve 5 with regard to the time, that is, by twice differentiating the curve 1 with regard to the time. The measure of the ordinate for the curves 5 and 6 is taken on some enlarged scale. Accordingly if the ordinate of the curve 6 is multiplied by a certain constant and the weight of the hammer is added thereto and if a curve is drawn by taking such amounts on the ordinate, then the resulting curve will show the impact resistance-and-time curve of the test piece. It is the object of my invention to provide an impact testing machine which will give this curve 6 in a most accurate and easy manner. By combining the curves 6 and 1 together the impact resistance and deformation curve can be obtained.

In order to obtain the acceleration curve diagrammatically from the curve 3 by differentiating it twice with regard to the time, the ordinates $a$, $b$, $c$ etc. should be drawn on a suitable scale on the abscissa OX such as to equal divisions of 1/4000 second. At the points of intersections $a_1$, $b_1$ and $c_1$ of these ordinates and the curve 3, the lines are drawn parallel to the abscissa such as $a_1$ $a_2$, $b_1$ $b_2$, etc. Then the lengths of $b_1$ $a_2$, $c_1$ $b_2$ etc. will indicate the mean velocity of the hammer in millimeters per second if the length is divided by the time interval of 1/4000 second and by 10, for instance, which is a multiplication constant used when the curve 3 is drawn. If the difference between $b_1$ $a_2$ and $c_1$ $b_2$ is divided by the square of the time interval such as $(1/4000)^2$ and by the multiplication constant 10 for instance, then the amount will give the negative acceleration of the hammer in millimeters per second at the point $b_1$. The curve 6 is drawn by the above described manner by twice differentiating the curve 3 diagrammatically, but it is not divided by $$\left(\frac{1}{4000}\right)^2$$

and the ordinates are multiplied by 200 and drawn in millimeter scale.

As it is apparent from the foregoing, if the above described diagrammatic differentiation should be carried out for the curve 1 as has been experienced with any known impact testing machine having a single main hammer only the similar curve 6 having the same enlargement as shown in Figure 1 could never be obtained unless the result is enlarged by 2000 times. That is, the difference between $b_1$ $a_2$ and $c_1$ $b_2$ will be very small if compared with the length $b$ in case of the curve 1. Accordingly there occurs a great error in measuring such a small amount and in this invention I have tried not to record the length $b$ which involves unnecessary and harmful large measures. In order to enlarge and to automatically record those portions lying between the curves 3 and 4 which latter is a parabola or to obtain more effective enlargement, I have adopted another parabola 7, for instance, which intersects the curve 3 and the small distances between the curves 3 and 7 may be enlarged, and recorded automatically. For this purpose I make use of an auxiliary hammer. The curve thus obtained is twice differentiated in the above described manner or by means of a differentiating instrument and its sign is changed, then the acceleration-time curve 6 is obtained. In order to draw the impact-resistance-and-time curve from the curve 6, the product of the acceleration and the mass of the hammer is taken on the ordinate and the time on the abscissa so that there is no need of adding the weight of hammer itself thereto.

The curve 8 shows a curve of the difference between the curves 4 and 3 recorded to enlarged scale of 10 times which corresponds with 100 times scale in case of using the curves 2 and 1. Accordingly if the acceleration is estimated from the curve 8 the estimation is not only very easy but also a more accurate result is obtained. The curve 9 shows the difference between the curves 7 and 3 recorded with 10 times enlargement and if the acceleration is measured by this curve the result will correspond to 100 times enlargement of that obtained from the curve 1. The curve 9 shows the same enlargement as the curve 8, yet it lies closer to the time abscissa so that more effective enlargement may result.

Now I will describe the construction of the testing machine embodying my invention referring to Figs. 2, 3 and 4. 1 represents a base of the machine, 2 represents an anvil, and 3 is a bending test piece resting on the anvil. 4 represents an upper anvil which is rigidly connected to the base 1 by means of stanchions 5. 6 represents guide posts, by which the main drop hammer 7 is slidably guided by means of projecting arms 8.

The moving part of this testing machine consists of a main drop hammer 7 and an auxiliary weight 11 which is associated with the main hammer so as to be slidable on the shank portion thereof. The main drop hammer 7 has a working knife edge 9 rigidly fixed thereto at the flange 10. 13 represents an electro-magnetic coil wound on the armature member 14 which is fixed to or integral with the upper part of the main drop hammer 7. The electro-magnet consisting of the coil 13 and the armature 14 serves to hold the auxiliary sliding weight 11 when the magnet is energized, but the coil is adapted to be deenergized at a suitable position when the hammer is falling by means of a suitable circuit controlling means and then the auxiliary weight 11 is allowed to drop freely. To the shank 12 of the main drop hammer is fixed a rack 16 which meshes with a segmental pinion 17 which is supported on the pivots 18 held by the lugs 19 projecting from the auxiliary weight 11. The pinion 17 is provided with a plane reflecting mirror 20 secured to the opposite side to the rack so that when the auxiliary weight 11 moves relatively to the main weight 7, the segmental pinion 17 will be turned by the rack 16, thereby deflecting the mirror 20.

The electro-magnet circuit controlling means may consist of any suitable switch for opening the circuit to de-energize the magnet and permit the auxiliary weight to fall freely. Such mechanism is well known in the electrical art and its construction forms no part of my invention. It may well comprise a wiper contact 101 mounted, for instance, on a projecting arm 8 of the main drop hammer and electrically insulated therefrom, and adapted to coact with an elongated stationary contact 102 mounted on any stationary part of the machine and insulated therefrom. Suitable leads extend from the stationary contact 102 and the movable contact 101 to the respective terminals of a source of electric supply and the lead from the movable contact may be connected to the electro-magnetic coil 13 so that the magnet is energized while the movable contact is in engagement with such stationary contact. Immediately contact is broken between these two contacts, the magnet is de-energized and the auxiliary weight drops freely.

In order to secure a tension test piece 22 in place a clamping cap 23 is screwed on to the top of the main drop hammer 7. This cap serves to firmly hold the tension test piece 22 in position by means of a flanged piece 24 which is screwed to the test piece shank, and a spherical seat 25 and a collar 26. To the other end of the test piece 22 is screwed the flanged piece 24' which is rigidly clamped to an abutment member 27 by means of a clamping cap 28 and a spherical seat 29.

30 represents an electro-magnet or other suitable means for hanging the total weight of the moving part up to a certain height and to drop the moving part as a whole when the magnet is deenergized or the other holding means (not shown) is disengaged. When the bending test is to be carried out the tension test piece 22 and the abutment member 27 are taken off and the electro-magnet 30 or other suitable gripping mechanism is connected to the clamping cap 23 directly.

31 represents a concave reflecting mirror fixed to one side of the main weight for distance on the post 15. 32, 33 in Fig. 4 represent horizontal slits; 34 and 35 are lenses; 36 and 37 represent light sources; 38 represents a camera having a vertical slit 39 and a film drum 40 which is driven by a motor 41 or by other suitable driving means. Thus the lights from the light sources 36 and 37 are projected through the lenses 34 and 35 as well as through the slits 32 and 33 and lens 48 onto the reflecting mirrors 20 and 31 respectively and are reflected thereby to form the images of the horizontal slits on the film drum 40 through slit 39 so that the movements of the dropping weight 7 and the auxiliary weight 11 can be photographed on the film of uniformly revolving drum 40 respectively as will be more fully described later.

In Fig. 5, I have shown a modified form of the photographing device by which the curve is drawn on a fixed or stationary film or dry plate 42. In this case a disc 43 having a number of slits 44 around its periphery is arranged to be driven by a motor 45 between slit 32 and lens 34. Accordingly if the disc 43 is turned at uniform speed it will act as a so-called revolving shutter with regard to the slit 32, thereby giving a high speed flickering light through the slit. By such means an intermittent light having a very small time interval such, for instance, as one-four thousandths of a second may be projected through the slit so that the image of the horizontal slit formed on the reflecting mirror through a lens 48 is focused on the stationary film or dry plate 42 with the same time interval.

In Figs. 6 and 8 I have shown a modified arrangement of the reflecting mirror. In this case I have used a concave mirror 20' which is secured to the segmental pinion 17 supported by the pivots 18 from the auxiliary weight 11. An idle pinion 46 is provided between the rack 16 and the segmental pinion 17. The idle pinion 46 is supported in the pivots 47 which are secured to the auxiliary moving weight 11.

I will explain the operation of this impact testing machine as shown in Figs. 2, 3 and 4. For impact tension testing, the bending test piece 3 is removed and the tension test piece 22 is secured in position as shown in Figs. 2 and 3 and all the moving parts are supported by the abutment member 27 on the upper anvil 4.

At this state the light beams from the light sources 36, 37 are projected through the slits 32 and 33 upon the mirrors 20 and 31 respectively and are reflected upon the film drum 40 as the image of each slit and accordingly if the drum 40 is turned for one revolution by the motor 41 a straight line is drawn on the film. Then the moving part is pulled up by means of the electro-magnet 30 or any other suitable gripping means to a required height and if the electro-magnet 30 is deenergized the moving weight as a whole will be dropped freely and the electro-magnetic coil 13 is deenergized at a suitable height before the abutment member 27 is arrested by the upper anvil 4. Then both of the main and auxiliary weights will fall at the same velocity and same acceleration and the entire parts acting as drop hammer can freely pass through the inside of the anvil 4, but the abutment member 27 is arrested by the anvil 4, then the weight will give the impact tension upon the test piece 22.

As the auxiliary weight 11 falls at the same speed and same acceleration as the main weight 7, if the drum 40 is turned at uniform speed a curve begins to be traced on the film from the point slightly before the abutment member is arrested by the anvil 4 and the time-displacement curve caused by the motion of the image of the horizontal slit through the vertical slit 39 is drawn with a certain enlargement which depends on the focal distance of the concave mirror 31 and the horizontal distance from the mirror to the front surface of the drum 40.

This curve representing the vertical displacement of the main drop hammer is shown by the parabolic part 3—O of the curve in Fig. 1. Until the abutment member is stopped by the upper anvil, since both dropping weights 7 and 11 will fall at the same speed there is no relative motion between the rack 16 and pinion 17, and accordingly the mirror 20 is not inclined and the displacement of the image of the horizontal slit 32 is along the horizontal line O—X from its left to the point O. After the impact the test piece is elongated to resist the impulsive force of the hammer which receives the negative acceleration so that its speed is reduced gradually. On the contrary the auxiliary weight will never undergo the change in motion and continues free descending motion so that there occurs relative displacement between both dropping weights. Hereupon the pinion 17 is turned by engaging with the rack 16 for a circumferential distance equal to the relative displacement so that the mirror 20 is inclined downwardly and the difference of the movement is enlarged with a multiplication ratio corresponding to the ratio of twice the horizontal distance from the mirror 20 to the front surface of the drum and the radius of the pinion, and the curve $OA_2$ of the curve 8 in Fig. 1 can be drawn by the mirror 20 while the concave mirror 31 will give the curve $OA_1$. When the test piece is broken the mirror 20 will project the straight line $A_2 B_2$ corresponding to the difference of velocities of both dropping weights at that instant and the mirror 31 will give a parabolic curve $A_1 B_1$. In other words, the curve 8 will represent the subtraction of each corresponding value on the curve 3 from that on the parabola 4 on an enlarged scale. This is the most important feature of the principle of operation of this testing machine.

In a modified form of this invention as shown in Figs. 6 and 7 a concave reflecting mirror 20' is used and it is moved by means of rack 16 through an idle pinion 46 in an opposite direction as the auxiliary weight is shifted, or the mirror is inclined upwardly. In this case the lens 48 may be omitted and the image of the horizontal slit 32 can be formed on the cylinder 40. Accordingly with such modified arrangement of mirror and means for moving the same, the numerical value which is the difference of movements of both drop weights in a multiplied measure substracted by a certain multiple of the displacement of the auxiliary drop weight can be obtained, that is, the curve 9 illustrating a certain multiple of the difference between the parabolic curve 7 and the curve 3 in Fig. 1 can be obtained. When the test piece is broken the lower part of the auxiliary drop hammer will rest on the cushion 21 (Fig. 2), and the turning of the pinion 17 is stopped then the point B of the curve 9 is obtained and the part BE of the right hand of the parabolic curve represents the free dropping of both weights as a unit.

Fig. 8 illustrates the test result made by using the arrangement of light interrupter as shown in Fig. 5. In this case, an interrupted light of intervals of 1/4000 second is projected through the slits 44, and the images are formed on the film with the interval of 1/4000 second and similarly the image of light passing through the slits 44' and horizontal slit 33 is focused on the dry plate by means of the concave mirror 31 with the same high speed interruption of light, then the result of the impact test will give a group of short parallel lines 50 and 51 instead of the curves 3 and 8 in Fig. 1. The difference between the distances to the adjacent parallel short lines from the base line multiplied by a constant corresponds theoretically with the acceleration of the drop hammer at any moment. As clearly seen by the straight lines the distance between adjacent short lines in the group 50 is almost uniform, but the difference is considerably large in the group 51. Thus by using the same dry plate for recording the acceleration the group of lines 51 has ten times amplification if compared with the group 50. Accordingly the acceleration of a drop hammer can be very accurately measured so that if the mass of the drop hammer is multiplied by the acceleration it will give the measure of the impact resisting force very accurately.

Though I have described in the foregoing embodiments of my invention as applied to the tension and bending test using a compound drop hammer, yet the same principle can be applied to the pendulum type impact tension and bending testing machines.

What I claim as new and desire to secure by Letters Patent of the United States, is:

1. A recording impact testing machine comprising a main hammer, an auxiliary weight movably carried by said main hammer, means associated with said weights adapted to be moved by the relative displacement between the same, a reflecting mirror supported by said means and adapted to move therewith, another reflecting mirror secured to the main hammer to move therewith, light projecting means for each of said mirrors, and a camera arranged in co-operative relation to said reflecting mirrors for recording to an enlarged scale the acceleration or retardation of the main hammer.

2. A recording impact testing machine comprising an upper anvil, a main hammer, an auxiliary hammer slidably mounted on the main hammer, means arranged between the hammers to be moved by relative movement between the same, a reflecting mirror carried by said means, a mirror fixed to the main hammer, an electromagnet secured to the main hammer and adapted to hold said auxiliary hammer in a fixed relation thereto, a gripping device for a tension test piece secured to the main hammer, an abutment member adapted to be clamped on the other end of the test piece and adapted to be arrested by the upper anvil, and a light projecting and photographing device arranged in cooperative relation to said mirrors.

3. A recording impact testing machine comprising a stationary base serving as a lower anvil for a bending test piece, an upper anvil rigidly connected with said base, a drop hammer consisting of a main weight and an auxiliary weight slidably attached to the former, clamping means secured to the top of the main weight for holding one end of a tension test piece, an abutment member adapted to be secured to the other end of the tension test piece, said abutment member being adapted to be arrested by said upper anvil, guiding means for allowing the auxiliary weight to pass freely through the upper anvil, a rack secured to said main weight, a pinion meshing with said rack and pivoted to said auxiliary weight, a plane reflecting mirror secured to one side of said pinion, a concave reflecting mirror secured to the main drop weight in parallel with said plane mirror, vibrating light projecting means associated with each of said mirrors, an energized electromagnet arranged on said main weight for holding said auxiliary weight in a definite relation to said main weight and means for de-energizing said magnet at a predetermined point in its drop to release the auxiliary weight.

4. A recording impact testing machine for taking a record of the variation of motion of the main dropping weight on an enlarged scale, a main dropping weight and an auxiliary weight mounted on the former in a relatively movable relation, a rack secured to the main weight, a segmental pinion pivoted to the auxiliary weight, an idle pinion pivoted to the latter meshing with said rack and said segmental pinion, a concave reflecting mirror attached to said segmental pinion, a plane reflecting mirror attached to said main weight in parallel relation to said concave mirror, a photographic device, light projecting means for each of said mirrors so arranged that the retardation of said main dropping weight can be recorded on an enlarged scale on the photographing device by means of said tiltable concave mirror, and an energized electro-magnet secured to said main weight for holding the auxiliary weight in a fixed relation, and means for de-energizing said magnet at a predetermined point during the motion of said main weight to release the auxiliary weight.

KAMEICHI YUASA.